(12) United States Patent
Fei

(10) Patent No.: US 6,271,639 B1
(45) Date of Patent: Aug. 7, 2001

(54) CAPACITOR START SINGLE PHASE INDUCTION MOTOR WITH PARTIAL WINDING STARTING

(75) Inventor: Renyan William Fei, St. Louis, MO (US)

(73) Assignee: Emerson Electric Co., St. Louis, MO (US)

( * ) Notice: Subject to any disclaimer, the term of this patent is extended or adjusted under 35 U.S.C. 154(b) by 0 days.

(21) Appl. No.: 09/500,105

(22) Filed: Feb. 8, 2000

(51) Int. Cl.$^7$ ........................................................ H02P 5/00
(52) U.S. Cl. .......................... 318/524; 318/777; 310/185
(58) Field of Search ................................... 318/524, 773, 318/774, 775, 777; 310/179, 180, 184, 185

(56) References Cited

U.S. PATENT DOCUMENTS

| | | | |
|---|---|---|---|
| 2,946,941 | * | 7/1960 | Jin ........................................ 318/223 |
| 4,103,213 | * | 7/1978 | Landgraf ........................... 318/224 R |
| 4,322,665 | * | 3/1982 | Landgraf .............................. 318/774 |
| 4,463,303 | * | 7/1984 | Kirschbaum ........................ 318/776 |
| 4,467,257 | * | 8/1984 | Douthart et al. ..................... 318/774 |
| 4,473,788 | * | 9/1984 | Kirschbaum ........................ 318/776 |
| 4,476,422 | * | 10/1984 | Kirschbaum ........................ 318/776 |
| 4,947,098 | * | 8/1990 | Vlasak ................................ 318/775 |
| 5,825,111 | * | 10/1998 | Fei ..................................... 310/179 |
| 5,883,488 | * | 3/1999 | Woodward .......................... 318/786 |
| 6,175,209 | * | 1/2001 | Fei ..................................... 318/776 |

FOREIGN PATENT DOCUMENTS

| | | | |
|---|---|---|---|
| 2031657 | * | 4/1980 | (GB) . |
| 015459 | * | 1/1983 | (JP) . |
| 230388 | * | 10/1987 | (JP) . |
| 228946 | * | 9/1988 | (JP) . |

OTHER PUBLICATIONS

Fei, et al., "An Experimental Study of Single–Phase Induction Motor Starting Performance and Its Dependency on Winding Harmonics", IEEE–IAS Annual Meeting, Paper No. EM–4–2–76, Oct., 1995.

Rajaraman, et al., IEEE, "Theory and Design of Part–Winding Starting", IEEE Transactions on Energy Conversion, vol. 14, no. 1, Mar. 1999, pp. 31–36.

* cited by examiner

*Primary Examiner*—Robert E. Nappi
*Assistant Examiner*—Rina I. Duda
(74) *Attorney, Agent, or Firm*—Senniger, Powers, Leavitt & Roedel

(57) ABSTRACT

A motor includes a stator core, a rotor in rotational relationship with the stator core and a main winding on the core. In one form, the main winding includes a 4-pole configuration and an 8-pole configuration and the motor has a 4-pole auxiliary winding on the core. A switching circuit selectively simultaneously energizes a portion only of the 4-pole configuration of the main winding and the 4-pole auxiliary winding when starting the motor for energizing the main winding in the 8-pole configuration. In another form, the main winding includes a 2-pole configuration and an 4-pole configuration and the motor has a 2-pole auxiliary winding on the core. In this latter form, the switching circuit selectively simultaneously energizes a portion only of the 2-pole configuration of the main winding and the 2-pole auxiliary winding when starting the motor for energizing the main winding in the 4-pole configuration. Other forms include a 4/6/8 pole motor, an n/m pole motor and an n/m/p pole motor where n, m, and p are even integers and n<p<m.

27 Claims, 5 Drawing Sheets

CAPACITOR START SINGLE PHASE INDUCTION MOTOR WITH PARTIAL WINDING STARTING

BACKGROUND OF THE INVENTION

1. Field of the Invention

The invention generally relates to capacitor start single phase induction motors and, in particular, to a 2/4 pole motor employing a partial 2-pole winding starting and to 4/8 and 4/6/8 pole motors employing a partial 4-pole winding starting.

2. Description of the Prior Art

Capacitor start single phase induction motors having two or more pole configurations are useful in multi-speed applications. For example, some washing machines employ 4/6/8 pole capacitor start single phase induction motors because such motors are able to adjust speed for various cycles within a certain speed range without the need for a complicated and expensive variable frequency controller. There is a continuing need to design such motors to provide good performance for both running and starting at a low cost of materials and manufacture. The running performance includes evaluating such factors as torque, speed, current, temperature rise, efficiency, size and other factors. The starting performance includes evaluation of the speed-torque curves of the motor. The minimum torque or torque dip at a speed between zero to the speed at breakdown torque can be a limiting factor for starting. Sometimes, a compromise needs to be made among the running performance, starting performance, material cost, tooling or other factors.

Some 4/6/8 pole motors in production employ basically independent 4-pole, 6-pole and 8-pole main windings and a 4-pole auxiliary winding. Only a small portion of a 6-pole winding is shared with a 4-pole winding. To reduce the size of the motor and save active material, a new approach to sharing the 4-pole and 8-pole windings has been developed and is described in co-invented, co-assigned PCT patent application Ser. No. PCT/US99/11235, filed May 20, 1999, entitled SINGLE PHASE THREE SPEED MOTOR WITH SHARED WINDINGS, the entire disclosure of which is incorporated herein by reference. One advantage of the shared winding approach is that it improves running performance without an increase in material cost. However, to reconnect the main winding from a 4-pole configuration to an 8-pole configuration, or visa versa, one more contact, such as a single pole single throw switch, is needed either as part of the starting switch or as part of the external circuit of the motor. If the additional contact is implemented as part of the starting switch, the starting switch will require three switches and four contacts. This implementation makes the starting switch more complicated and expensive to retool and produce. On the other hand, if the additional contact is implemented as part of the external circuit of the motor, the additional contact would be in the form of a timer or a relay. However, since the 4-pole to 8-pole reconnection is implemented by the external circuit, the motor cannot use 4-pole starting for 8-pole running without affecting the starting performance. Using 6-pole starting can avoid this problem (see PCT/US99/11235 noted above). However, when the motor employs 6-pole starting and 4-pole running, a torque dip occurs during the transfer from 6-pole to 4-pole. To cancel the dip, a time delay relay is required to maintain the 6-pole auxiliary winding in the circuit 40 ms longer during transfer from starting to running. The relay is an additional component providing additional cost.

There is a need for a 4/8 pole and 4/6/8 pole motors which employ 4-pole starting so that many of the above problems are avoided. There is also a need for a 2/4 pole motor which employs 2-pole starting so that many of the above problems are avoided.

SUMMARY OF THE INVENTION

It is an object of this invention to reduce material costs in a capacitor start single phase induction motor by employing a partial winding starting.

It is another object of this invention to reduce material costs while improving performance of such a motor.

It is another object of this invention to employ partial winding starting in a capacitor start single phase induction motor without the need for a retooled starting switch.

It is another object of the invention to employ only a single 4-pole auxiliary winding in a 4/8 pole and 4/6/8 pole capacitor start single phase induction motor.

It is another object of the invention to employ the entire 8-pole configuration of the main winding as part of the 4-pole configuration of the main winding in a 4/8 pole and 4/6/8 pole capacitor start single phase induction motor so that there is no independent 8-pole winding.

In one form, the invention is a motor comprising a stator core, a rotor in rotational relationship with the stator core, a main winding on the core having at least a 4-pole configuration and an 8-pole configuration, a 4-pole auxiliary winding on the core, and a switching circuit. The switching circuit selectively simultaneously energizes a portion only of the 4-pole configuration of the main winding and the 4-pole auxiliary winding when starting the motor for energizing the main winding in the 8-pole configuration.

In another form, the invention is a motor comprising a stator core, a rotor in rotational relationship with the stator core, a main winding on the core having at least a 2-pole configuration and an 4-pole configuration, a 2-pole auxiliary winding on the core and a switching circuit. The switching circuit selectively simultaneously energizes a portion only of the 2-pole configuration of the main winding and the 2-pole auxiliary winding when starting the motor for energizing the main winding in the 4-pole configuration.

In another form, the invention is a motor comprising a stator core, a rotor in rotational relationship with the stator core, a main winding on the core having at least an n-pole configuration and an m-pole configuration where n and m are even numbers and n<m, a n-pole auxiliary winding on the core and a switching circuit. The switching circuit selectively simultaneously energizes a portion only of the n-pole configuration of the main winding and the n-pole auxiliary winding when starting the motor for energizing the main winding in the m-pole configuration. Other objects and features will be in part apparent and in part pointed out hereinafter.

BRIEF DESCRIPTION OF THE DRAWINGS

Corresponding reference characters indicate corresponding parts throughout the drawings.

DESCRIPTION OF PREFERRED EMBODIMENTS

Figure 1:
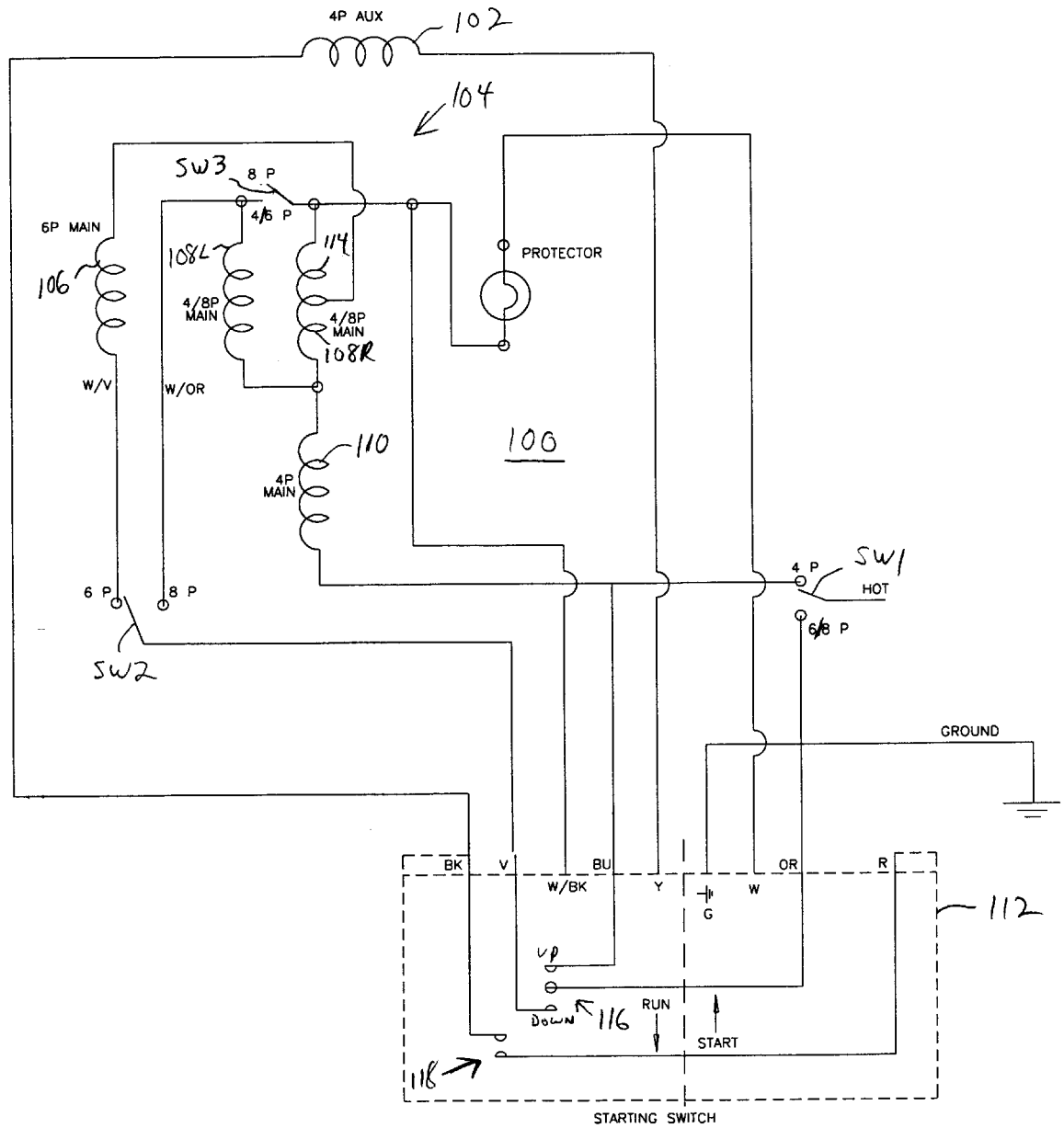
FIG. 1 is a schematic diagram of the electrical circuit of one preferred embodiment of the 4/6/8 pole motor according to the invention including a partial 4-pole winding starting for 8 pole running illustrating the connections to the starting switch.

In general, a motor according to the invention includes a stator core, a rotor in rotational relationship with the stator core, and a winding on the core. Referring to FIG. 1, a schematic diagram of the electrical circuit of one preferred embodiment of a 4/6/8 pole motor 100 according to the invention is illustrated. This circuit includes a single auxiliary winding 102 on the core which is a 4-pole starting winding and the only auxiliary winding. The motor 100 according to the invention also preferably includes a shared main winding 104 including two 4/8 pole main windings 108L and 108R/114 and a 4-pole main winding 110. The motor 100 also includes a 6-pole winding 106. The motor 100 also includes three switches SW1, SW2, SW3 which selectively connect the various main windings into either a 4-pole, 6-pole or 8-pole configuration.

In the 4-pole configuration, switch SW1 is in an UP position 4P and switch SW3 is in a DOWN position 4/6P or closed. Switch SW2 can be in either position in the 4-pole configuration. In the 4-pole start configuration, the 4-pole main winding 104 including windings 108L, 108R/114 and 110 are energized along with the 4-pole auxiliary winding 102. In the 4-pole run configuration, the two 4/8P main windings 108L and 108R/114 are connected in parallel with each other and in series combination with the 4P main winding 110. The 6P main winding 106 is open circuited via a centrifugal starting switch 112, which will be described below in greater detail.

In the 6-pole configuration, switch SW1 is in a DOWN position 6/8P, switch SW2 is in a LEFT position 6P, and switch SW3 is in a DOWN position 4/6P or closed. In the 6-pole start configuration, the 4-pole main winding 104 including windings 108L, 108R/114 and 110 are energized along with the 4-pole auxiliary winding 102. This is the same configuration as the 4-pole start configuration. In the 6-pole run configuration, the 6P main winding 106 is energized along with an upper portion 114 of the 4/8P main winding 108R/114. The 4/8P main winding 108R/114 and the 4/8 pole main winding 108L form a loop, and the 4P main winding 110 is open circuited by the starting switch 112.

In the 8-pole configuration, switch SW1 is in the DOWN position 6/8P, switch SW2 is in a RIGHT position 8P and switch SW3 is in an UP position 8P or open. In the 8-pole start configuration, only part of the 4-pole main winding 104, i.e., only windings 108/R114 and 110, are energized along with the 4-pole auxiliary winding 102. In the 8-pole run configuration, 4/8P main winding 108L is in series with 4/8P main winding 108R/114 while 4P main winding 110 and 6P main winding 106 are open circuited by the starting switch 112 and switch SW2.

The starting switch 112 is a standard starting switch having only three contacts including a single pole, double throw switch 116 and a single pole, single throw switch 118. The starting switch 112 selectively energizes the auxiliary winding 102 and the above-noted portions of main winding 104 in the 4-pole start configuration (windings 108L, 108R/114 and 110), in the 6-pole start configuration (windings 108L, 108R/114 and 110) and in the 8-pole start configuration (windings 108R/114 and 110). The starting switch 112 selectively energizes the main winding 104 in the 4-pole run configuration (windings 108L, 108R/114 and 110), in the 6-pole run configuration (windings 106 and 114) and in the 8-pole run configuration (windings 108L and 108R/114).

In particular, in the 4-pole START or UP configuration, switch 116 of starting switch 112 connects terminal 6/8P of switch SW1 (which is open circuited). The 4P terminal of switch SW1 is closed to energize 4P main winding 104 and switch 118 of starting switch 112 is closed to energize 4P auxiliary winding 102. In the 4-pole RUN or DOWN configuration, switch 116 connects the open circuited terminal 6/8P of switch SW1 to switch SW2 and switch 118 is open so that the 4P auxiliary winding 102 is open circuited.

In the 6-pole START or UP configuration, switch 116 of starting switch 112 connects the energized 6/8P terminal of switch SW1 to the 4P main winding 104. In the 6P START or UP configuration, switch 118 of starting switch 112 is closed to energize 4P auxiliary winding 102. In the 6-pole RUN or DOWN configuration, switch 116 connects the energized 6/8P terminal of switch SW1 to the 6P main winding 106 via switch SW2 in the 6P position and switch 118 is open so that the 4P auxiliary winding 102 is open circuited.

In the 8-pole START or UP configuration, switch 116 of starting switch 112 connects the energized 6/8P terminal of switch SW1 to the 4P main winding 110 and switch 118 of starting switch 112 is closed to energize 4P auxiliary winding 102. In the 8-pole RUN or DOWN configuration, switch 116 connects the energized 6/8P terminal of switch SW1 to 4/8P main winding 108L via switch SW2 in position 8P. Switch 118 is open so that the 4P auxiliary winding 102 is open circuited.

The following table illustrates the various connections of the starting switch 112:

| 6P | 4P | 8P | REFERENCES |
|---|---|---|---|
| L1 TO W | L1 TO W | L1 TO W | |
| L2 TO R & OR | L2 TO R & BU | L2 TO R & OR | TIMER/SW-1 SINGLE-POLE DOUBLE-THROW |
| JUMPER W/V & V | | JUMPER W/ OR & V | TIMER/SW-2 SINGLE-POLE DOUBLE-THROW |
| JUMPER W/ OR & W/BK | JUMPER W/OR & W/BK | | TIMER/SW-3 SINGLE-POLE DOUBLE-THROW |

A starting capacitor (e.g., 270 μf, 110v) is connected between the yellow (Y) and white/black (W/BK) wires. For rotation in the clockwise direction, switch lead ends to reverse rotation by interchanging the yellow (Y) and red (R) wires.

Main winding 104 is referred to as a shared main winding because a portion, i.e., windings 108L and 108R/114, of the main winding 104 is employed in both the 4-pole and 8-pole run configurations and a portion, i.e., winding 110, of the main winding 104 is not employed in the 8-pole run configuration because the 4P main winding 110 is not part of the 8-pole run configuration. As a result, the entire 8-pole run configuration of windings 108L and 108R/114 is part of the 4-pole configuration of windings 108L, 108R/114 and 110 so that there is no independent 8-pole winding.

The motor 100 of the invention is referred to as having partial winding starting because it employs a partial 4-pole main winding for starting when running in the 8 pole configuration. In particular, the full 4-pole main winding 104 comprises first, second and third windings 108R/114, 108L and 110 which are selectively, simultaneously energized in the 4-pole and 6-pole start configurations. In contrast, the partial 4-pole winding starting according to the invention, as illustrated in FIG. 1, only employs first and third windings 108R/114 and 110 which are selectively, simultaneously energized for starting the motor 100 when running in the 8-pole configuration, i.e., energizing the 8-pole portion (windings 108L and 108R/114) of the main winding 104. Hence, only part of a full 4-pole main winding 104, i.e., only windings 108R/114 and 110, is employed during starting when running in the 8-pole configuration so that motor 100 shown in FIG. 1 according to the invention is referred to as a capacitor start single phase induction motor with partial 4-pole winding starting. As a result, the starting switch 112 constitutes a switching circuit for selectively simultaneously energizing a portion (only first and third windings 108R/114 and 110) of the 4-pole start configuration of the main winding 104 for starting the motor 100 when running in the 8-pole configuration wherein the second and third windings 108L and 108R/114 are energized.

Although FIG. 1 illustrates a 4/6/8 pole motor, it is also contemplated that the invention comprise a 4/8 pole motor. In the case of a 4/8 pole motor, 6-pole main winding 106 and switch SW2 may be eliminated from FIG. 1 with the violet wire (V) permanently connected to white/orange wire (W/OR) so that the violet wire (V) is permanently connected to winding 108L.

Figure 2:
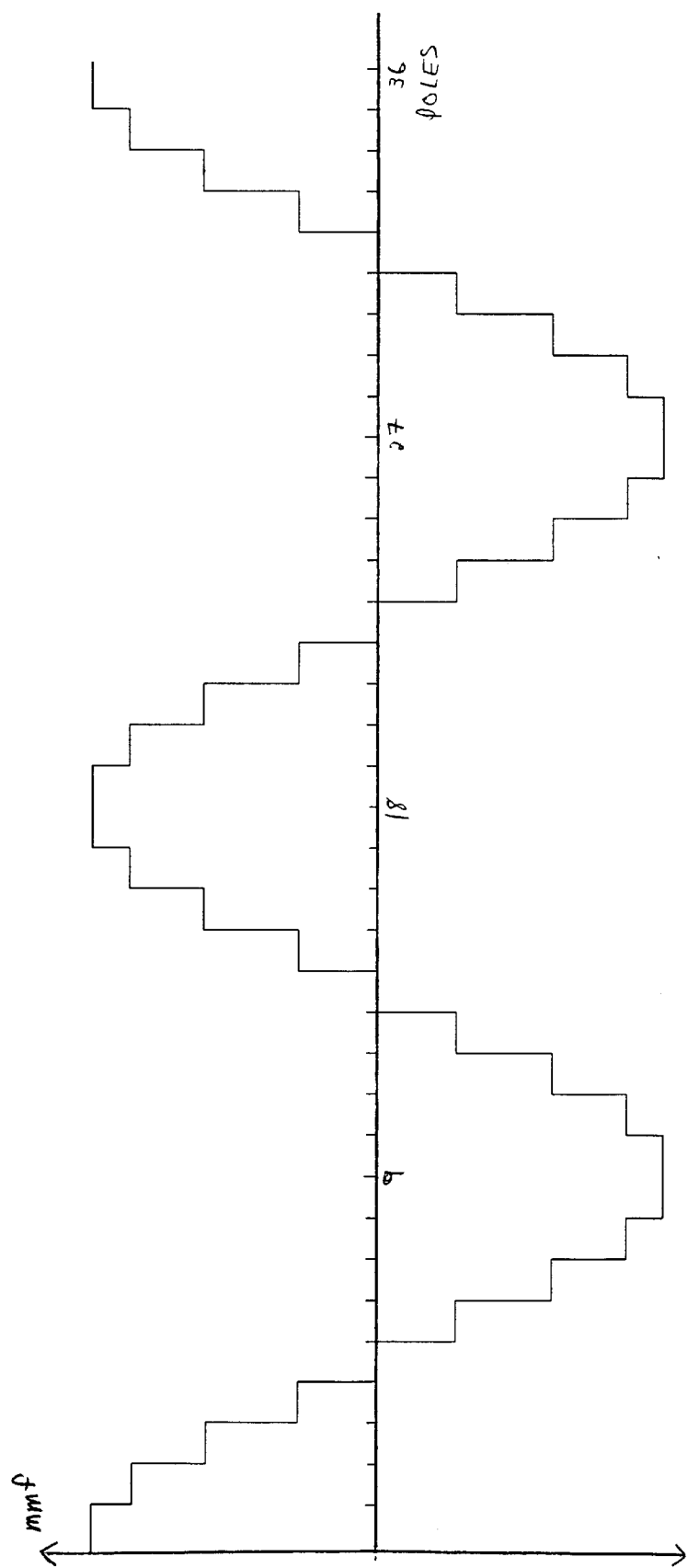
FIG. 2 is a graph illustrating the magnetic motive force distribution produced by a full 4-pole main winding in the 4-pole and 6-pole start configuration of a 4/6/8 pole motor, the graph having poles along the horizontal x-axis and magnetic motive force along the vertical y-axis.
Figure 3:
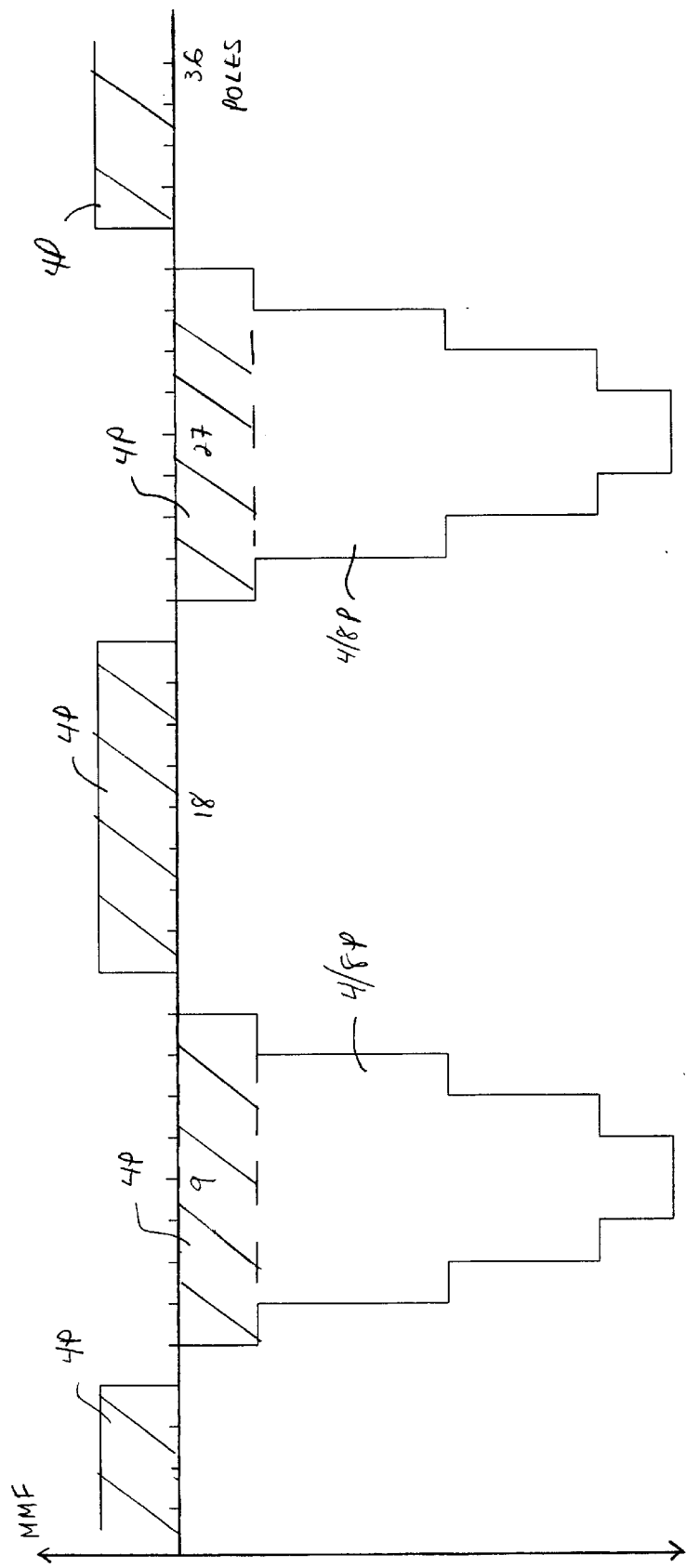
FIG. 3 is a graph illustrating the magnetic motive force distribution produced by a partial 4-pole main winding in the 8-pole start configuration of the 4/6/8 pole motor of FIG. 1 according to the invention, the graph having poles along the horizontal x-axis and magnetic motive force along the vertical y-axis.

The magnetic motive force (mmf) distribution produced by a full 4-pole main winding in the 4-pole and 6-pole start configurations of a 4/6/8 pole motor which does not employ a partial winding starting is illustrated in FIG. 2. As can be seen, the mmf waveform is substantially symmetrical. The mmf distribution produced by a partial 4-pole main winding in the 8-pole start configuration of the 4/6/8 pole motor 100 of the invention has a waveform as shown in FIG. 3. The asymmetrical aspect of this waveform reveals the existence of a strong second harmonic mmf. In particular, a cross-hatched area labeled 4P represents the mmf contributed by the 4-pole main winding 110 and an area 4/8P below the cross-hatched area 4P represents the mmf contributed by the 4/8 pole main windings 108R/114.

Figure 4:
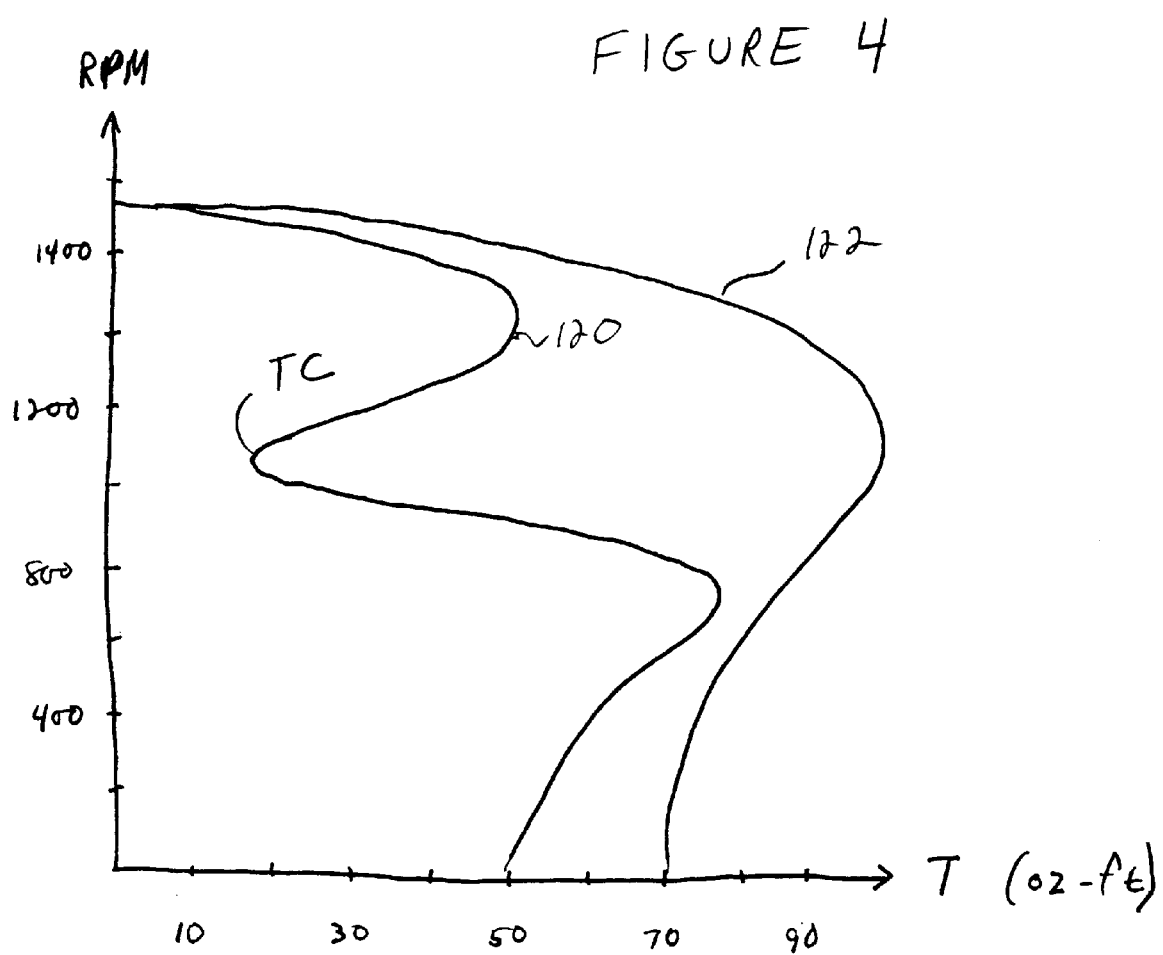
FIG. 4 is a graph illustrating speed/torque curves with torque (T) in oz-ft. along the horizontal x-axis and RPMs along the vertical y-axis of the 4/6/8 pole motor illustrating a partial 4-pole winding starting according to the invention and illustrating a full 4-pole winding starting.

FIG. 4 is a graph illustrating speed/torque curves with torque in oz-ft. along the horizontal x-axis and rpm along the vertical y-axis of the 4/8 pole motor at 115 volts. Curve 120 illustrates the speed/torque curve for a partial 4-pole winding starting according to the invention when the partial 4-pole main winding 108R/114 and 110 and the 4-pole auxiliary winding 102 are simultaneously energized in the 8-pole start configuration. Curve 122 illustrates the speed/torque curve without partial winding starting when the full 4-pole main winding 108L, 108R/114, 110 and the 4-pole auxiliary winding 102 are simultaneously energized in the 4-pole and 6-pole start configurations. Thus, the partial winding starting illustrated by curve 120 introduces a torque cusp TC. This torque cusp TC is present even though the mmf of the auxiliary winding 102 approximates a regular sinusoidal waveform (not shown). The zero crossing point of the second harmonic torque, i.e., the torque produced by the second harmonic mmf, occurs at about 900 rpm whereas the minimum torque at the torque cusp TC appears at around 1100 rpm. Since the 8-pole load speed is about 850 rpm, the starting torque with partial main winding starting (shown by waveform 120) is sufficient to bring the rotor to the 8-pole load speed as long as the starting switch 112 is actuated and moved to the DOWN or RUN position at about 950 rpm.

FIG. 4 shows that the torque/speed curve 122 of a full 4-pole main winding starting does not have a torque cusp TC as compared to the torque/speed curve 120 of a partial 4-pole main winding starting. In order to minimize the effect of the torque cusp TC upon the actuation of the starting switch 112, the start/run switching speed of the switch 112 should be below a speed range (e.g., 1,000–2,000 rpm) of the torque cusp TC. For example, a start/run switching speed of 1,100 rpm would occur within the speed range of torque cusp TC and produce about 18 oz. ft. of torque (see waveform 120 @ 1,100 rpm), which may be insufficient to activate the starting switch 112 when the motor starts with a load. By lowering the start/run switching speed to 950 rpm, actuation would occur at the speed range having about 40 oz. ft. of torque (see waveform 120 @ 950 rpm), which should be sufficient to actuate the starting switch 112. By modifying the start/run switching speed to be below the speed range of the torque cusp TC, the need for additional components such as a time delay relay or the need for a starting switch that requires additional contacts is eliminated.

Figure 5:
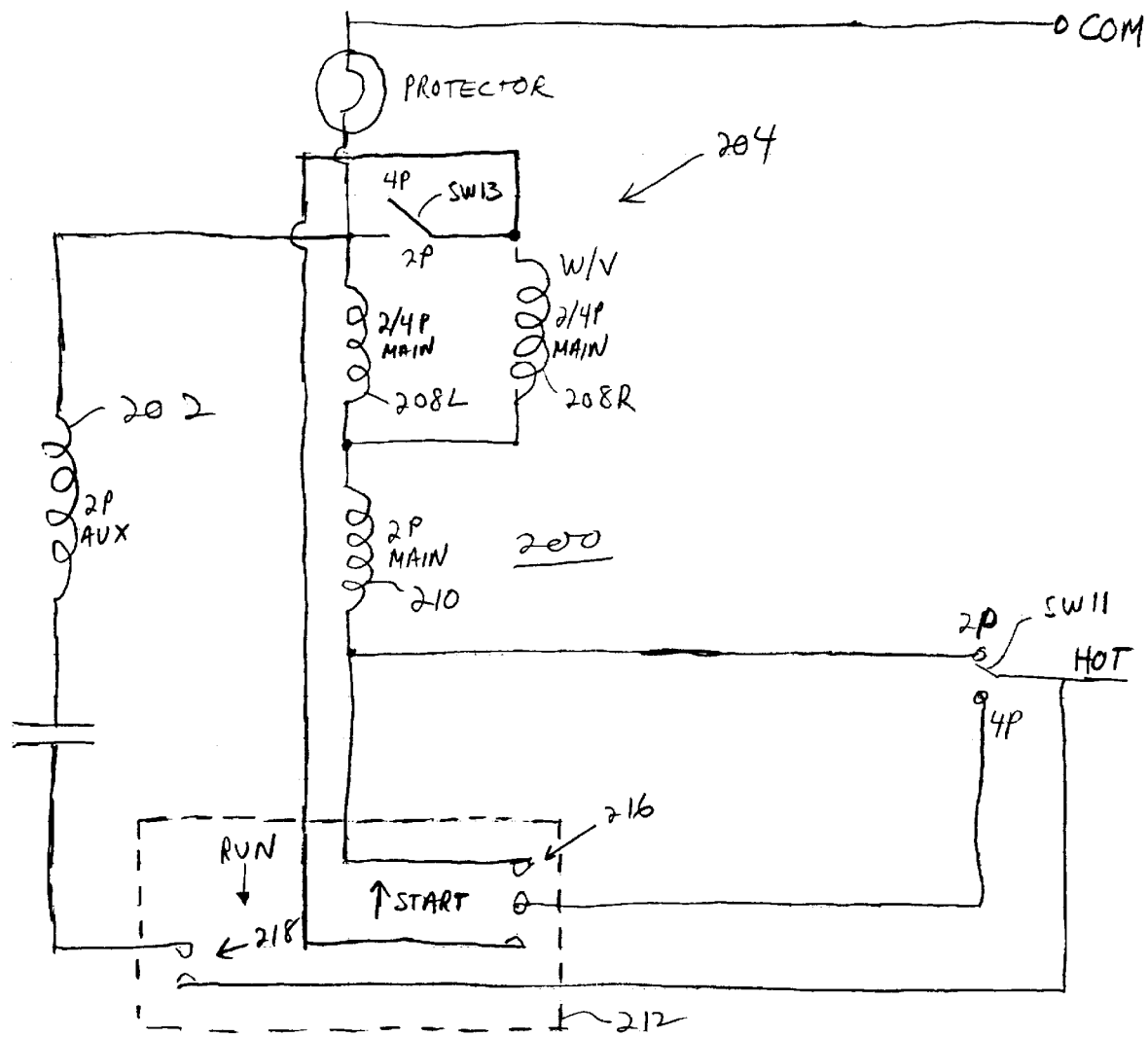
FIG. 5 is a schematic diagram of the electrical circuit of one preferred embodiment of the 2/4 pole motor according to the invention including a partial 2-pole winding starting for 4 pole running illustrating the connections to the starting switch.

Referring to FIG. 5, a schematic diagram of the electrical circuit of one preferred embodiment of a 2/4 pole motor 200 according to the invention is illustrated. This circuit includes a single auxiliary winding 202 on the core which is a 2-pole starting winding and the only auxiliary winding. The motor 200 according to the invention also preferably includes a shared main winding 204 including two 2/4 pole main windings 208L and 208R and a 2-pole main winding 210. The motor 200 also includes two switches SW11, SW13 which selectively connect the various main windings into either a 2-pole or 4-pole configuration.

In the 2-pole configuration, switch SW11 is in an UP position 2P and switch SW13 is in a DOWN position 2P or closed. In the 2-pole start configuration, the 2-pole main winding 204 including windings 208L, 208R and 210 are energized along with the 2-pole auxiliary winding 202. In the 2-pole run configuration, the two 2/4P main windings 208L and 208R are connected in parallel with each other and in series combination with the 2P main winding 210.

In the 4-pole configuration, switch SW11 is in the DOWN position 4P and switch SW13 is in an UP position 4P or open. In the 4-pole start configuration, only part of the 2-pole main winding 204, i.e., only windings 208L and 210 are energized along with the 2-pole auxiliary winding 202. In the 4-pole run configuration, 2/4P main winding 208L is in series with 2/4P main winding 208R while 2P main winding 210 is open circuited by a starting switch 212.

The starting switch 212 is a standard starting switch having only three contacts including a single pole, double throw switch 216 and a single pole, single throw switch 218. The starting switch 212 selectively energizes the auxiliary winding 202 and the above-noted portions of main winding 204 in the 2-pole start configuration (windings 208L, 208R and 210), and in the 4-pole start configuration (windings 208L and 210). The starting switch 212 selectively energizes the main winding 204 in the 2-pole run configuration (windings 208L, 208R and 110), and in the 4-pole run configuration (windings 208L and 208R).

Main winding 204 is referred to as a shared main winding because a portion, i.e., windings 208L and 208R, of the main winding 204 is employed in both the 2-pole and 4-pole run configurations and a portion, i.e., winding 210, of the main winding 204 is not employed in the 4-pole run configuration because the 2P main winding 210 is not part of the 4-pole run configuration. As a result, the entire 4-pole run configuration of windings 208L and 208R is part of the 2-pole configuration of windings 208L, 208R and 210 so that there is no independent 4-pole winding.

The motor 200 of the invention is referred to as having partial winding starting because it employs a partial 2-pole main winding for starting when running in the 4-pole configuration. In particular, the full 2-pole main winding 204 comprises first, second and third windings 208L, 208R and 210 which are selectively, simultaneously energized in the 2-pole start configuration. In contrast, the partial 2-pole winding starting according to the invention, as illustrated in FIG. 5, only employs first and third windings 208L and 210 which are selectively, simultaneously energized for starting the motor 200 when running in the 4-pole configuration, i.e., energizing the 4-pole portion (windings 208R and 208L) of the main winding 204. Hence, only part of a full 2-pole main winding 204, i.e., only windings 208L and 210, is employed during starting when running in the 4-pole configuration so that motor 200 shown in FIG. 5 according to the invention is referred to as a capacitor start single phase induction motor with partial 2-pole winding starting. As a result, the starting switch 212 constitutes a switching circuit for selectively simultaneously energizing a portion (only first and third windings 208L and 210) of the 2-pole start configuration of the main winding 204 for starting the motor 200 when running in the 4-pole configuration wherein the second and third windings 208R and 208L are energized).

In general, it is contemplated that the main winding 104 have at least an n-pole configuration and an m-pole configuration where n and m are even numbers and n<m (e.g., n=2 and m=4 as shown in FIG. 5, or n=4 and m=8, or n=8 and m=16, and so on . . . ). In addition, it is contemplated that the main winding 104 have at least an n-pole configuration, an m-pole configuration and a p-pole configuration where n, m and p are even numbers and n<p<m (e.g., n=4, p=6 and m=8 as shown in FIG. 1, or n=8, p=12 and m=16, and so on . . . )

In view of the above, it will be seen that the several objects of the invention are achieved and other advantageous results attained.

As various changes could be made in the above products and methods without departing from the scope of the invention, it is intended that all matter contained in the above description and shown in the accompanying drawings shall be interpreted as illustrative and not in a limiting sense.

What is claimed is:

1. A motor comprising:
   a stator core;
   a rotor in rotational relationship with the stator core;
   a main winding on the core having at least a 4-pole configuration and an 8-pole configuration;
   a 4-pole auxiliary winding on the core; and
   a switching circuit for starting the motor to operate in the 8-pole configuration by selectively simultaneously energizing a portion only of the 4-pole configuration of the main winding and the 4-pole auxiliary winding.

2. The motor of claim 1 wherein the switching circuit selectively energizes the main winding in the 4-pole configuration and wherein the switching circuit selectively energizes the main winding in the 8-pole configuration.

3. The motor of claim 1 wherein the main winding has a 6-pole configuration and wherein the switching circuit selectively energizes the main winding in the 6-pole configuration.

4. The motor of claim 1 wherein the 4-pole auxiliary winding is the only auxiliary winding.

5. The motor of claim 1 wherein the entire 8-pole configuration of the main winding is part of the 4-pole configuration of the main winding so that there is no independent 8-pole winding.

6. The motor of claim 1 wherein the main winding is a shared main winding having a portion which is employed in both the 4-pole and 8-pole configurations.

7. The motor of claim 1 wherein a speed/torque curve of the motor includes a torque cusp within a speed range and wherein the switching circuit includes a centrifugal starting switch having a start/run switching speed below the speed range of the torque cusp.

8. The motor of claim 1 wherein the switching circuit includes a centrifugal starting switch with only three contacts and a start/run switching speed of about 950 rpm.

9. The motor of claim 1 wherein the 4-pole configuration of the main winding has first, second and third windings and wherein the switching circuit simultaneously energizes the first and third windings and the 4-pole auxiliary winding when starting the motor for energizing the main winding in the 8-pole configuration.

10. A motor comprising:
    a stator core;
    a rotor in rotational relationship with the stator core;
    a main winding on the core having at least a 2-pole configuration and an 4-pole configuration;
    a 2-pole auxiliary winding on the core; and
    a switching circuit for starting the motor to operate in the 4-pole configuration by selectively simultaneously energizing a portion only of the 2-pole configuration of the main winding and the 2-pole auxiliary winding.

11. The motor of claim 10 wherein the switching circuit selectively energizes the main winding in the 2-pole configuration and wherein the switching circuit selectively energizes the main winding in the 4-pole configuration.

12. The motor of claim 10 wherein the 2-pole auxiliary winding is the only auxiliary winding.

13. The motor of claim 10 wherein the entire 4-pole configuration of the main winding is part of the 2-pole configuration of the main winding so that there is no independent 4-pole winding.

14. The motor of claim 10 wherein the main winding is a shared main winding having a portion which is employed in both the 2-pole and 4-pole configurations.

15. The motor of claim 10 wherein a speed/torque curve of the motor includes a torque cusp within a speed range and wherein the switching circuit includes a centrifugal starting switch having a start/run switching speed below the speed range of the torque cusp.

16. The motor of claim 10 wherein the 2-pole configuration of the main winding has first, second and third windings and wherein the switching circuit simultaneously energizes the first and third windings and the 2-pole auxiliary winding when starting the motor for energizing the main winding in the 4-pole configuration.

17. A motor comprising:

a stator core;

a rotor in rotational relationship with the stator core;

a main winding on the core having at least an n-pole configuration and an m-pole configuration where n and m are even numbers and n<m;

a n-pole auxiliary winding on the core; and a switching circuit for starting the motor to operate in the m-pole configuration by selectively simultaneously energizing a portion only of the n-pole configuration of the main winding and the n-pole auxiliary winding.

18. The motor of claim 17 wherein the switching circuit selectively energizes the main winding in the n-pole configuration and wherein the switching circuit selectively energizes the main winding in the m-pole configuration.

19. The motor of claim 17 wherein the main winding has a p-pole configuration wherein n<p<m and p is an even number, and wherein the switching circuit selectively energizes the main winding in the p-pole configuration.

20. The motor of claim 19 wherein n=4, p=6 and m=8.

21. The motor of claim 17 wherein the n-pole auxiliary winding is the only auxiliary winding.

22. The motor of claim 17 wherein the entire m-pole configuration of the main winding is part of the n-pole configuration of the main winding so that there is no independent m-pole winding.

23. The motor of claim 17 wherein the main winding is a shared main winding having a portion which is employed in both the n-pole and m-pole configurations.

24. The motor of claim 17 wherein a speed/torque curve of the motor includes a torque cusp within a speed range and wherein the switching circuit includes a centrifugal starting switch having a start/run switching speed below the speed range of the torque cusp.

25. The motor of claim 17 wherein the n-pole configuration of the main winding has first, second and third windings and wherein the switching circuit simultaneously energizes the first and third windings and the n-pole auxiliary winding when starting the motor for energizing the main winding in the m-pole configuration.

26. The motor of claim 17 wherein n=4 and m=8.

27. The motor of claim 17 wherein n=2 and m=4.

\* \* \* \* \*

UNITED STATES PATENT AND TRADEMARK OFFICE
Certificate

Patent No. 6,271,639                                                                  Patented: August 7, 2001

On petition requesting issuance of a certificate for correction of inventorship pursuant to 35 U.S.C. 256, it has been found that the above identified patent, through error and without deceptive intent, improperly sets forth the inventorship.

Accordingly, it is hereby certified that the correct inventorship of this patent is: Renyan William, St. Louis, Missouri; and Mark C. Dierkes, Arnold, Missouri.

Signed and Sealed this Fourteenth Day of May 2002.

<div style="text-align:right">

ROBERT NAPPI
*Supervisory Patent Examiner*
Art Unit 2837

</div>

UNITED STATES PATENT AND TRADEMARK OFFICE
Certificate

Patent No. 6,271,639                                                       Patented: August 7, 2001

On petition requesting issuance of a certificate for correction of inventorship pursuant to 35 U.S.C. 256, it has been found that the above identified patent, through error and without deceptive intent, improperly sets forth the inventorship.

Accordingly, it is hereby certified that the correct inventorship of this patent is: Renyan William Fei, St. Louis, Missouri; and Mark C. Dierkes, Arnold, Missouri.

This Certificate supersedes Certificate issued May 14, 2002.

Signed and Sealed this Twentieth Day of August 2002.

ROBERT NAPPI
*Supervisory Patent Examiner*
Art Unit 2837